United States Patent
Warner et al.

(10) Patent No.: US 10,639,664 B2
(45) Date of Patent: May 5, 2020

(54) MASKING PLUG ASSMEBLY (71) Applicant: The Boeing Company, Chicago, IL (US)

(72) Inventors: Theodore Warner, Glen Carbon, IL (US); James L. Scherer, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 15/726,846

(22) Filed: Oct. 6, 2017

(65) Prior Publication Data
US 2019/0105680 A1  Apr. 11, 2019

(51) Int. Cl.
B05B 12/26  (2018.01)
B05B 12/20  (2018.01)
B29C 65/56  (2006.01)

(52) U.S. Cl.
CPC .............. *B05B 12/26* (2018.02); *B05B 12/29* (2018.02); *B29C 65/565* (2013.01)

(58) Field of Classification Search
CPC ....... B05B 12/26; B05B 12/29; Y10S 220/19; B65D 39/12; B65D 39/0088; B65D 39/08; B65D 41/28; B65D 41/58
See application file for complete search history.

(56) References Cited

U.S. PATENT DOCUMENTS

| | | | |
|---|---|---|---|
| 3,667,640 A * | 6/1972 | Morrow ................. | F16L 55/132 138/89 |
| 4,493,344 A * | 1/1985 | Mathison ............... | B65D 39/12 138/89 |
| 4,640,434 A | 2/1987 | Johnson et al. | |
| 4,844,285 A | 7/1989 | Horiki et al. | |
| 7,464,727 B1 * | 12/2008 | Larson ................... | F16L 55/11 138/89 |
| 9,121,243 B1 * | 9/2015 | Headifen ................ | E21B 33/02 |
| 10,214,923 B2 * | 2/2019 | Elduayen Madariaga ................... | E04G 17/0644 |

(Continued)

OTHER PUBLICATIONS

Special Masking "Sink-O-Masks—SOM", Brochure, 2 pages.

(Continued)

*Primary Examiner* — Shawn M Braden
(74) *Attorney, Agent, or Firm* — McDonnell Boehnen Hulbert & Berghoff LLP (57) ABSTRACT

A masking plug assembly includes a lower anvil and an elongate member coupled to a central portion of the lower anvil, where the elongate member includes at least one coupling part. The assembly also includes an upper anvil having a central opening for receiving the elongate member therethrough, where the upper anvil includes at least one complementary coupling part configured to be releasably coupled with the at least one coupling part of the elongate member. The assembly also includes a deformable plug with a central opening for receiving the elongate member therethrough, where the deformable plug is configured to be positioned within the hole of the structure between the lower anvil and the upper anvil, and where the deformable plug is composed of a resilient material such that at least a portion of the deformable plug expands horizontally when compressed vertically between the lower anvil and the upper anvil.

17 Claims, 7 Drawing Sheets

(56) References Cited

U.S. PATENT DOCUMENTS

| | | | |
|---|---|---|---|
| 2004/0178167 A1* | 9/2004 | Lin | B65D 39/0076 |
| | | | 215/360 |
| 2010/0101492 A1* | 4/2010 | Sarajian | B05B 12/26 |
| | | | 118/504 |
| 2011/0287551 A1* | 11/2011 | Weiller | G01N 27/06 |
| | | | 436/103 |
| 2015/0190836 A1 | 7/2015 | Deck et al. | |

OTHER PUBLICATIONS

Hangon "Plugs for Countersink Holes", online catalog, www.hangon.com, 2 pages.
Caps' n Plugs "Masking Plugs", online catalog, www.capsnplugs.com, 5 pages.
Hangon "Masking for Holes", online catalog, www.hangon.com, 3 pages.
Epsi "Masking Plugs", online catalog, www.epsi.com, 4 pages.

* cited by examiner

MASKING PLUG ASSMEBLY

FIELD

The present disclosure generally relates to a masking plug assembly for protecting a hole in a structure.

BACKGROUND

Determinant Assembly (DA) describes a manufacturing process that uses high tolerance digital modeling and numerical control machines to manufacture parts that can self-locate based on the precision of the mating parts, such as holes. The protection of finished hole surfaces in a given part through subsequent part processing can be an important consideration in DA, as the edges of the holes can be vulnerable to fatigue effects and contamination resulting from chemical treatments or other manufacturing processes. Existing solutions used to mask hole surfaces are labor intensive to install and remove, may not provide assurance of protection, and can be ineffective for use with non-cylindrical holes.

What is needed is an improved way to protect a finished hole in a structure during the subsequent manufacturing processes of the structure.

SUMMARY

In one example, a masking plug assembly for protecting a hole in a structure is described including a lower anvil and an elongate member coupled to a central portion of the lower anvil, where the elongate member comprises at least one coupling part. The masking plug assembly also includes an upper anvil having a central opening for receiving the elongate member therethrough, where the upper anvil comprises at least one complementary coupling part configured to be releasably coupled with the at least one coupling part of the elongate member. The masking plug assembly also includes a deformable plug comprising a central opening for receiving the elongate member therethrough, where the deformable plug is configured to be positioned within the hole of the structure between the lower anvil and the upper anvil, and where the deformable plug is composed of a resilient material such that at least a portion of the deformable plug expands horizontally when compressed vertically between the lower anvil and the upper anvil.

In another example, a method for installing a masking plug assembly to protect a hole in a structure is described. The method includes positioning a deformable plug within the hole of the structure, where the deformable plug comprises a central opening for receiving an elongate member therethrough, and where the deformable plug is composed of a resilient material such that at least a portion of the deformable plug expands horizontally when compressed vertically. The method also includes inserting the elongate member through the central opening of the deformable plug, where the elongate member comprises at least one coupling part. The method also includes releasably coupling an upper anvil to the elongate member on a first side of the hole, where the elongate member is coupled to a central portion of a lower anvil on a second side of the hole, and where the upper anvil includes at least one complementary coupling part configured to be releasably coupled with the at least one coupling part of the elongate member. The method also includes compressing the deformable plug between the lower anvil and the upper anvil such that the deformable plug deforms to seal an interior surface of the hole.

In another example, a masking plug assembly for protecting a hole in a structure is described including a threaded screw comprising a head. The masking plug assembly also includes a threaded washer, where the threaded washer is sized to engage the threaded screw. The masking plug assembly also includes a deformable plug including a central opening for receiving the threaded screw therethrough, where the deformable plug is configured to be positioned within the hole of the structure between the head and the threaded washer, and where the deformable plug is composed of a resilient material such that at least a portion of the deformable plug expands horizontally when compressed vertically between the head and the threaded washer.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Examples discussed herein include a making plug assembly for protecting a hole in a structure and methods for installing the masking plug assembly. For example, the masking plug assembly may include a deformable plug that is configured to be positioned within the hole and then compressed between an upper and lower anvil that are coupled together through a central opening in the deformable plug. In particular, the deformable plug may expand horizontally when subject to the vertical compression such that the deformable plug seals the edges of the hole and protects the interior surface of the hole.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
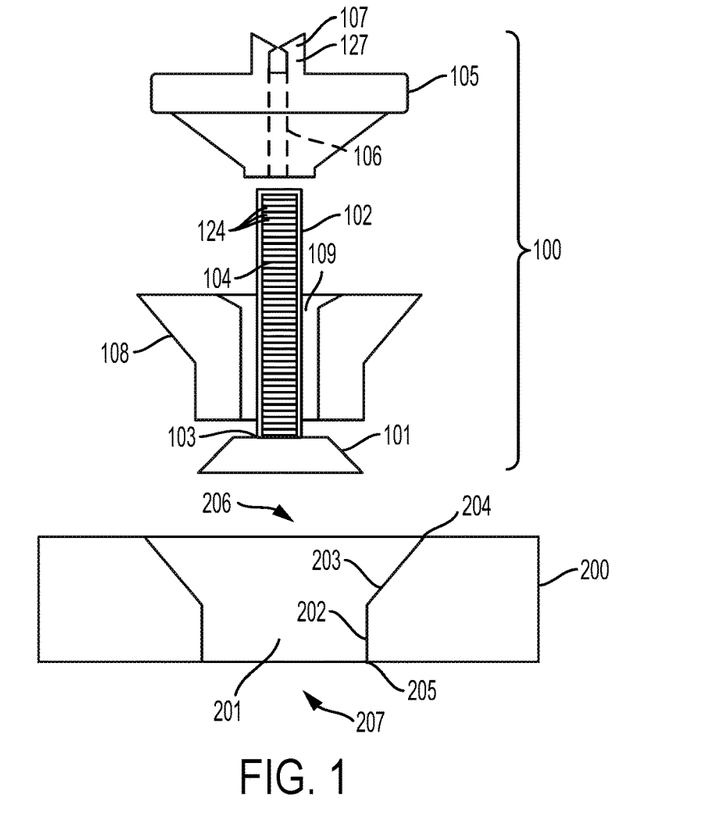
FIG. 1 illustrates a cross-sectional view of a partially assembled masking plug assembly, according to an example implementation.

Referring now to FIG. 1, a cross-sectional view of a masking plug assembly 100 for protecting a hole 201 in a structure 200 is shown. The hole 201 to be protected may take a number of forms. For example, the hole 201, shown in profile in FIG. 1, is a cylindrical hole that is countersunk on one end. Other hole shapes are also possible. Generally, the hole 201 is or includes an opening in the structure 200, for example. The hole 201 includes an upper countersunk edge 204 on a first side 206 of the whole 201, and a lower edge 205 on a second side 207 of the hole 201. In some implementations, the lower edge 205 of the hole 201 may include a relatively small chamfer, or rounded fillet. The hole 201 also has an interior surface 202, which, in the example shown in FIG. 1, includes a countersunk surface 203. As noted above, it may be desirable to seal and protect the interior surface 202, including the countersunk surface 203, of the hole 201 as the structure 200 is subjected to chemical treatments or other manufacturing processes.

The masking plug assembly 100 for protecting the hole 201 includes a lower anvil 101 and an elongate member 102 coupled to a central portion 103 of the lower anvil 101. The elongate member 102 includes at least one coupling part 104. As shown in the example of FIG. 1, the at least one coupling part 104 may be a series of ribs 124 disposed along the elongate member 102. For instance, in some implementations, the elongate member 102 may take the form of a relatively flat strip, and the series of ribs 124 on the elongate member 102 may take the form of corrugations or teeth similar to those found on a cable tie.

The masking plug assembly 100 shown in FIG. 1 further includes an upper anvil 105. The upper anvil 105 includes a central opening 106 for receiving the elongate member 102 therethrough. The upper anvil 105 also includes at least one complementary coupling part 107 configured to be releasably coupled with the at least one coupling part 104 of the elongate member 102. For example, in the example shown in FIG. 1, the at least one complementary coupling part 107 of the upper anvil 105 takes the form of a plurality of ratchet protrusions 127 sized to engage the series of ribs 124. The plurality of ratchet protrusions 127 in FIG. 1 are positioned on either side of the central opening 106, and engage the series of ribs 124 as the elongate member 102 is inserted through the central opening 106. Other arrangements for the plurality of ratchet protrusions 127 are also possible.

In FIG. 1, the series of ribs 124 and the plurality of ratchet protrusions 127 are shown in a relative orientation that makes them both visible, for illustrative purposes. However, the series of ribs 124 and the plurality of ratchet protrusions 127 do not engage each other in the orientation shown, and would need to be properly aligned in order to be coupled together. For example, the elongate member 102 may be rotated 90 degrees (as shown in FIG. 2) in order for the series of ribs 124 to properly engage the plurality of ratchet protrusions 127.

The masking plug assembly 100 further includes a deformable plug 108 with a central opening 109 for receiving the elongate member 102 therethrough, as can be seen in FIG. 1. The deformable plug 108 is configured to be positioned within the hole 201 of the structure 200. For instance, the shape of the deformable plug 108 in FIG. 1 corresponds to the countersunk shape of the hole 201. Further, the deformable plug 108 is configured to be positioned between the lower anvil 101 and the upper anvil 105 as they are coupled together. Moreover, the deformable plug 108 is composed of a resilient material such that at least a portion of the deformable plug 108 expands horizontally when compressed vertically between the lower anvil 101 and the upper anvil 105. The deformable plug 108 may be composed of rubber, for example, although other materials having a relatively low durometer are also possible, provided they can withstand the chemical treatments and other manufacturing processes that are contemplated for the structure 200.

Figure 2:
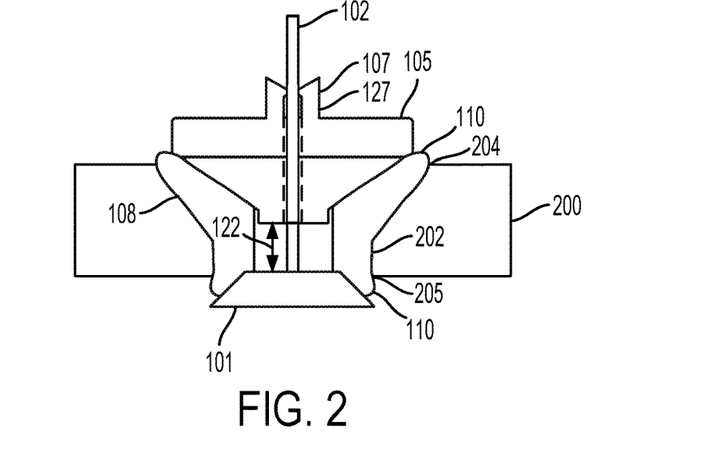
FIG. 2 illustrates a cross-sectional view of an assembled masking plug assembly in a hole in a structure, according to an example implementation.

Moving now to FIG. 2, an assembled view of the masking plug assembly 100 is shown, illustrating the deformation of the deformable plug 108 discussed above. The deformable plug 108 is positioned within the hole 201 of the structure 200, between the lower anvil 101 and the upper anvil 105, and the flat side of the elongate member 102 can be seen. The series of ribs 124 (not shown) have been engaged with the plurality of ratchet protrusions 127 such that the lower anvil 101 and the upper anvil 105 have been urged together to vertically compress the deformable plug 108. In some implementations, as shown in FIG. 2, the coupling part 104 and the complementary coupling part 107 may be configured such that a distance 122 between the lower anvil 101 and the upper anvil 105 progressively decreases as the at least one coupling part 104 of the elongate member 102 and the at least one complementary coupling part 107 of the upper anvil 105 are progressively coupled together. In this way, the amount of vertical compression, and corresponding horizontal expansion, may be increased as the coupling parts are tightened.

As shown in FIG. 2, as a result of the vertical compression of the deformable plug 108, an end portion 110 of the deformable plug 108 in contact with the lower anvil 101 has expanded horizontally. Similarly, another end portion 110 of the deformable plug 108, this one contacting the upper anvil 105, expands horizontally. As shown in FIG. 2, the end portions 110 of the deformable plug 108 extends out of the hole 201 of the structure 200 along the interior surface 202 of the hole 201. Further, the horizontal expansion of the end portions 110 of the deformable plug 108 may have the effect of sealing the interior surface 202 of the hole 201. In particular, the end portions 110 may seal the lower edge 205 and the upper edge 204 of the hole 201, thereby protecting the interior surface 202 of the hole 201. In an implementation where the lower edge 205 includes a chamfer or fillet, the end portion 110 may expand to cover and seal the chamfer or fillet.

To facilitate the horizontal expansion of the deformable plug 108 for sealing the upper edge 204 and the lower edge 205, the height of the deformable plug 108 may be greater than the height of the hole 201. Accordingly, when the deformable plug 108 is positioned within the hole 201, before it is compressed, the end portions 110 of the deformable plug 108 may extend vertically beyond both the upper edge 204 and the lower edge 205 of the hole 201.

The vertical compression necessary to seal the upper edge 204 and lower edge 205 of the hole 201 to protect the interior surface 202 may vary between applications. For example, the degree of vertical compression needed may depend on the size and shape of the deformable plug 108 in relation to the hole 201, the durometer of the material used for the of the deformable plug 108, the viscosity of the chemical treatment that will be applied to the structure 200, among other considerations. In some implementations, the deformable plug 108 may be compressed until a predetermined height between the lower anvil 101 and the upper anvil 105 is obtained. In another case, the deformable plug 108 may be compressed to a predetermined torque value. Other possibilities also exist.

While the masking plug assembly 100 is installed in the hole 201, a chemical treatment or other manufacturing process may be applied to the structure 200. For instance, the structure 200 may undergo an anodizing process in an acid bath, it may be primed and/or painted, acid etched, hard-coated, pickled to among numerous other possibilities. The masking plug assembly 100 may seal and protect the interior surface 202 of the hole 201 during any of these processes.

As noted above, the at least one coupling part 104, shown in FIGS. 1 and 2 as a series of ribs, and the at least one complementary coupling part 107, shown as a plurality of ratchet protrusions 127, may be releasably coupled together. For example, the plurality of ratchet protrusions 127 shown in FIG. 2 may be separated, disengaging them from the series of ribs 124, and thereby by allowing the elongate member 102 to be withdrawn from the central opening 106 of the upper anvil 105. In this way, the masking plug assembly 100 may be removed from the hole 201 structure 200 when the manufacturing processes are complete, and there is no longer a need to protect the hole 201. Moreover, the masking plug assembly 100 may then be reused, to protect another hole in another structure.

Figure 3:
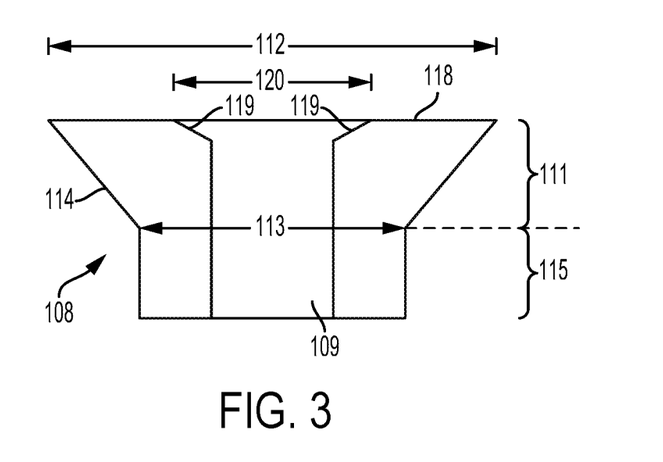
FIG. 3 illustrates a cross-sectional view of a deformable plug of a masking plug assembly, according to an example implementation.
Figure 4:
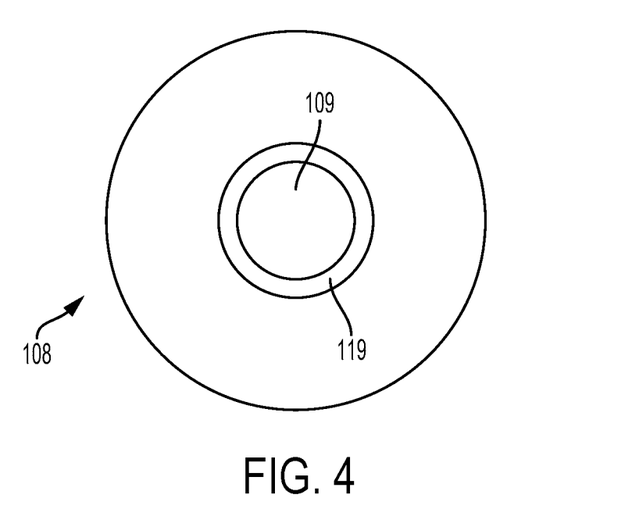
FIG. 4 illustrates a top view of a deformable plug of a masking plug assembly, according to an example implementation.

FIG. 3 shows a cross-sectional view, and FIG. 4 shows a top view, of the deformable plug 108 according to an example implementation. As noted above, the shape of the deformable plug 108 may correspond to the shape of the hole 201. Accordingly, the deformable plug 108 includes a frusto-conical portion 111 having an upper diameter 112 and a smaller, lower diameter 113 connected by an angled portion 114. The deformable plug 108 also includes a cylindrical portion 115 extending from the lower diameter 113 of the frusto-conical portion 111. Other shapes are also possible.

In some embodiments, the deformable plug 108 may include a top side 118 that includes a chamfer 119 surrounding the central opening 109. The chamfer 119 may include an outer diameter 120, and may facilitate the interaction of the deformable plug 108 with the upper anvil 105, as further discussed below. number 119 to explain that the chamfer/countersink assists with the forming and reduces the probably of the anvil 105 binding up with plug 108

Figure 5:
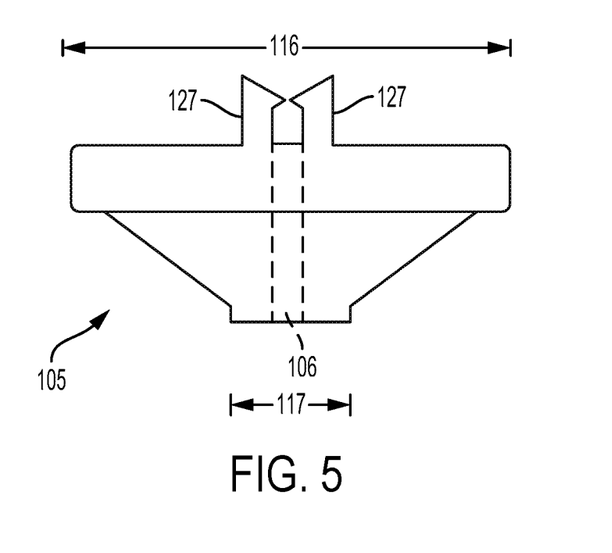
FIG. 5 illustrates a cross-sectional view of an upper anvil of a masking plug assembly, according to an example implementation.
Figure 6:
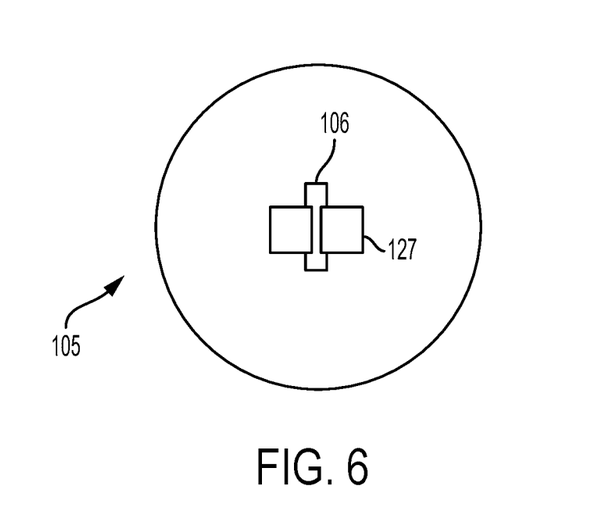
FIG. 6 illustrates a top view of an upper anvil of a masking plug assembly, according to an example implementation.

FIG. 5 shows a cross-sectional view, and FIG. 6 shows a top view, of the upper anvil 105 according to an example implementation. The upper anvil 105 may include an upper diameter 116 and a smaller, lower diameter 117. In the examples shown in FIGS. 1-6, the upper anvil 105 has a partially frusto-conical shape, similar to both the deformable plug 108 and the hole 201. However, the shape of the upper anvil 105 might not be exclusively driven by the shape of the hole 201. For instance, the shape of the upper anvil 105 shown in FIGS. 1-6 may facilitate the horizontal expansion of the end portions 110 of the deformable plug 108, and the sealing of the upper edge 204 of the hole 201 as the deformable plug 108 is vertically compressed by the upper anvil 105. As such, the shape of the upper anvil 105 may be beneficial for other holes that are not counter sunk. As one example, the lower anvil 101 shown in FIGS. 1-6 is also frusto-conical in shape, although it contacts the cylindrical portion 115 of the deformable plug 108. Here, the angled portion of the lower anvil 101, when vertically urged against the deformable plug 108, may facilitate the horizontal expansion of the end portions 110 of the deformable plug 108, and the sealing of the lower edge 205 of the hole 201.

As noted above, the chamfer 119 on the top side 118 of the deformable plug 108 may also facilitate the interaction of the deformable plug 108 with the upper anvil 105. For example, the outer diameter 120 of the chamfer 119 may be larger than the lower diameter 117 of the upper anvil 105, allowing the lower end of the upper anvil 105 to be partially inserted into the central opening 109 of the deformable plug 108, and may reduce the likelihood that the upper anvil 105 will bind against the deformable plug 108. This may facilitate the horizontal expansion of the end portions 110 of the deformable plug 108, and the sealing of the upper edge 204 of the hole 201. Although it is not shown here, a bottom side of the deformable plug 108 may include a similar chamfer, and may facilitate a similar interaction with the lower anvil 101.

In some implementations, it may be desirable for the masking plug assembly 100 to be configured such that it may be installed with access to only one side of the hole 201. For example, the structure 200 may have a size or shape that makes simultaneous access to both sides of the hole 201 difficult.

Figure 7:
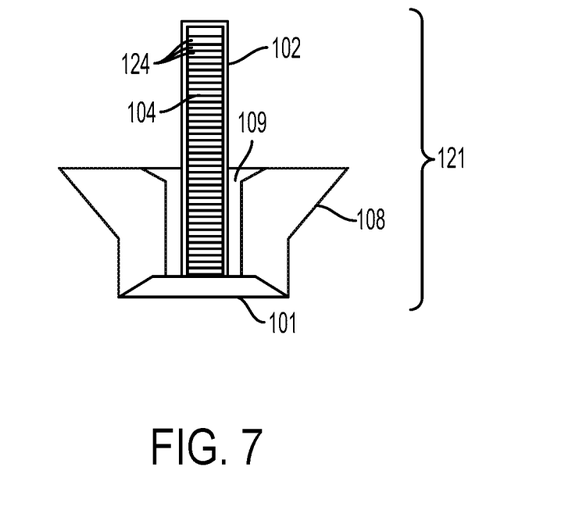
FIG. 7 illustrates a cross-sectional view of a portion of a masking plug assembly and a hole in a structure, according to an example implementation.

FIG. 7 illustrates a portion of the masking plug assembly 100 where the lower anvil 101 and the deformable plug 108 are one integral part 121. For example, the lower anvil 101 may be inserted into a mold for the deformable plug 108, which may then be molded around the lower anvil 101. Other possibilities also exist. This arrangement may allow the deformable plug 108 to be placed into the hole 201 from the same side of the hole 201 that the upper anvil 105 will eventually occupy. The elongate member 102 is also included in the integral part 121 shown in FIG. 7, although it may be incorporated before or after the lower anvil 101 is molded with the deformable plug 108. For example, the elongate member 102 may be formed integrally with the lower anvil 101, both of which are then molded integrally with the deformable plug 108. Alternatively, the elongate member 102 may be inserted through the central opening 109 and coupled to the lower anvil 101 after the lower anvil 101 is molded into the deformable plug 108. Other possibilities also exist.

Figure 8:
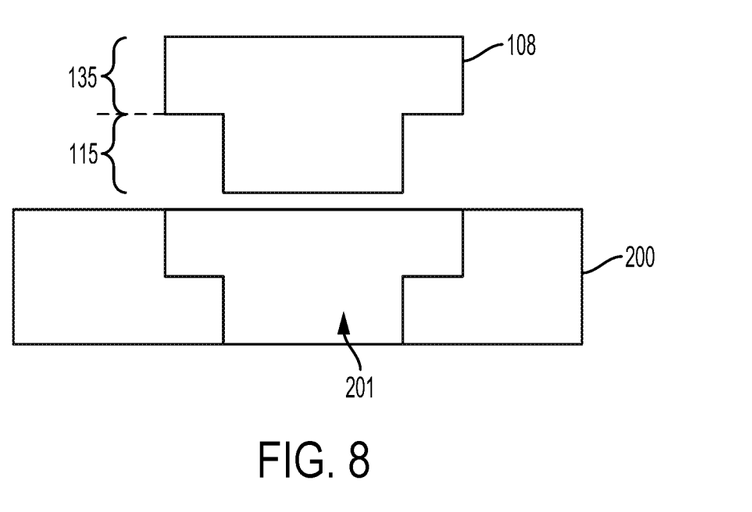
FIG. 8 illustrates a deformable plug of a masking plug assembly and a cross-sectional view of a hole in a structure, according to an example implementation.

As noted above, the hole 201 of the structure 200 may take numerous shapes other than the countersunk shape-shown in FIGS. 1 and 2. For example, FIG. 8 shows an example of a hole 201 that is counter-bored, which may be desirable in some applications. In this embodiment, the deformable plug 108 may have a corresponding shape, including a second cylindrical portion 135, rather than the frusto-conical portion 111 discussed above. As previously noted, the height of the deformable plug 108 shown in FIG. 8 may be greater than the height of the hole 201, to facilitate the horizontal expansion of the deformable plug 108 discussed above. Other shapes are also possible, including a hole in the structure 200 that is cylindrical only, without a counter-sunk or counter-bored portion, among other examples.

Further, the coupling parts of the elongate member 102 and upper anvil 105 may take a different form than the series of ribs 124 and plurality of ratchet protrusions 127 discussed above. For example, in some implementations, the coupling part 104 of the elongate member 102 may include one or more apertures along its length that are configured to receive a complementary coupling part 107 in the form of a pin, such as a cotter pin or a split pin. Once the deformable plug 108 is positioned within the hole 201 and the elongate member 102 is inserted through the central opening 106 of the upper anvil 105, the deformable plug 108 may be compressed between the lower anvil 101 and the upper anvil 105 and the pin may be inserted into the aperture of the elongate member 102, holding the upper anvil 105 in place relative to the elongate member 102.

Figure 9:
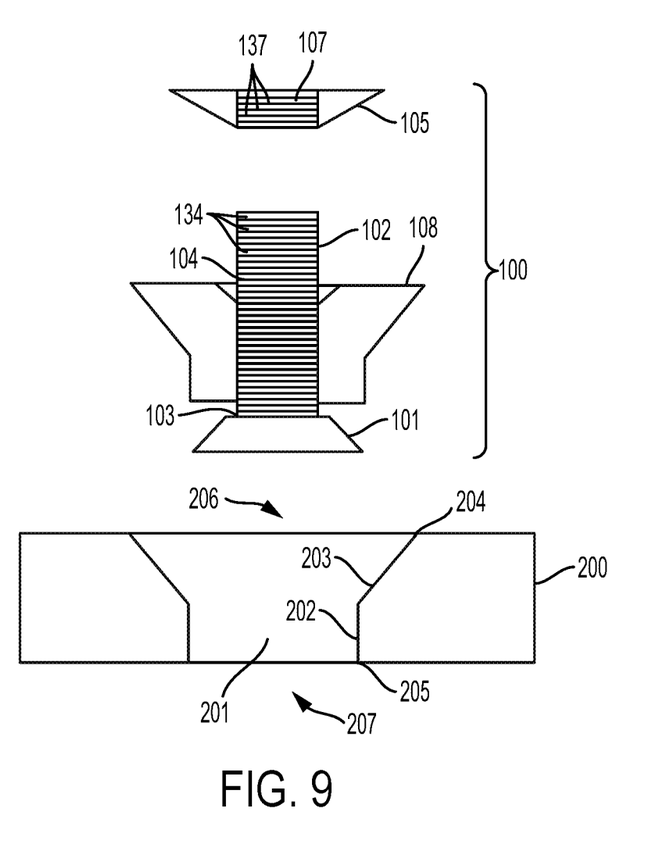
FIG. 9 illustrates a cross-sectional view of a partially assembled masking plug assembly, according to an example implementation.

FIG. 9 illustrates another example implementation of the masking plug assembly 100 in which the elongate member 102 is a cylindrical, screw-like component. Accordingly, the at least one coupling part 104 includes threads 134 disposed around a circumference of the elongate member 102. For example, the threads 134 may be included on an exterior surface of the elongate member 102, and may ascend the length of the elongate member like a screw. Similarly, the at least one complementary coupling part 107 of the upper anvil 105 includes complementary threads 137 disposed around the central opening 106 of the upper anvil 105 and sized to engage the threads 134 of the elongate member 102 via rotation of the upper anvil 105. For example, the complementary threads 137 may be included on an interior surface of the central opening 106 of the upper anvil 105, similar to a threaded washer or nut.

Figure 10:
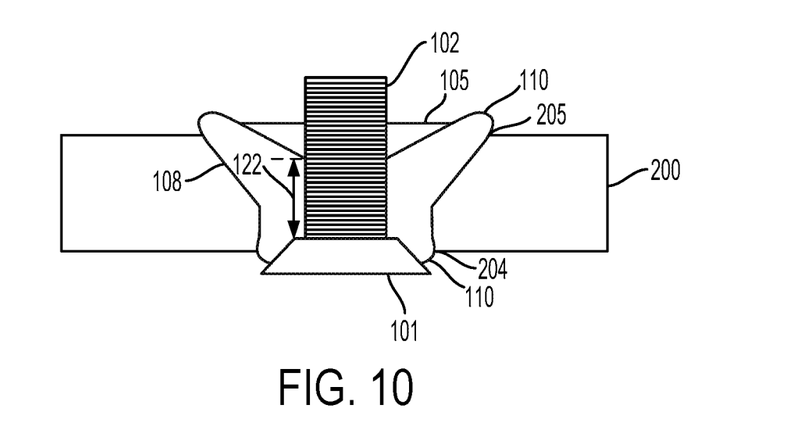
FIG. 10 illustrates a cross-sectional view of an assembled masking plug assembly in a hole in a structure, according to an example implementation.

FIG. 10 shows an assembled view of the masking plug assembly of FIG. 9, in which the upper anvil 105 has been coupled to the elongate member 102 via the threads 134, and tightened such that the deformable plug 108 is compressed vertically. In this way, similar to the implementation shown in FIGS. 1 and 2, the distance 122 between the lower anvil 101 and the upper anvil 105 may progressively decrease as the upper anvil 105 is progressively coupled onto the elongate member 102.

The complementary threads 137 of the upper anvil 105 may be arranged is various ways. In some implementations, the upper anvil 105 may include a rotatable top section that includes the complementary threads 137. The top section of the upper anvil 105 may be rotated relative to the elongate member 102 in order to couple the two components together. In this arrangement, the bottom section of the upper anvil 105 that contacts the deformable plug 108 need not rotate with respect to the deformable plug 108, which may be desirable in some situations.

Figure 11:
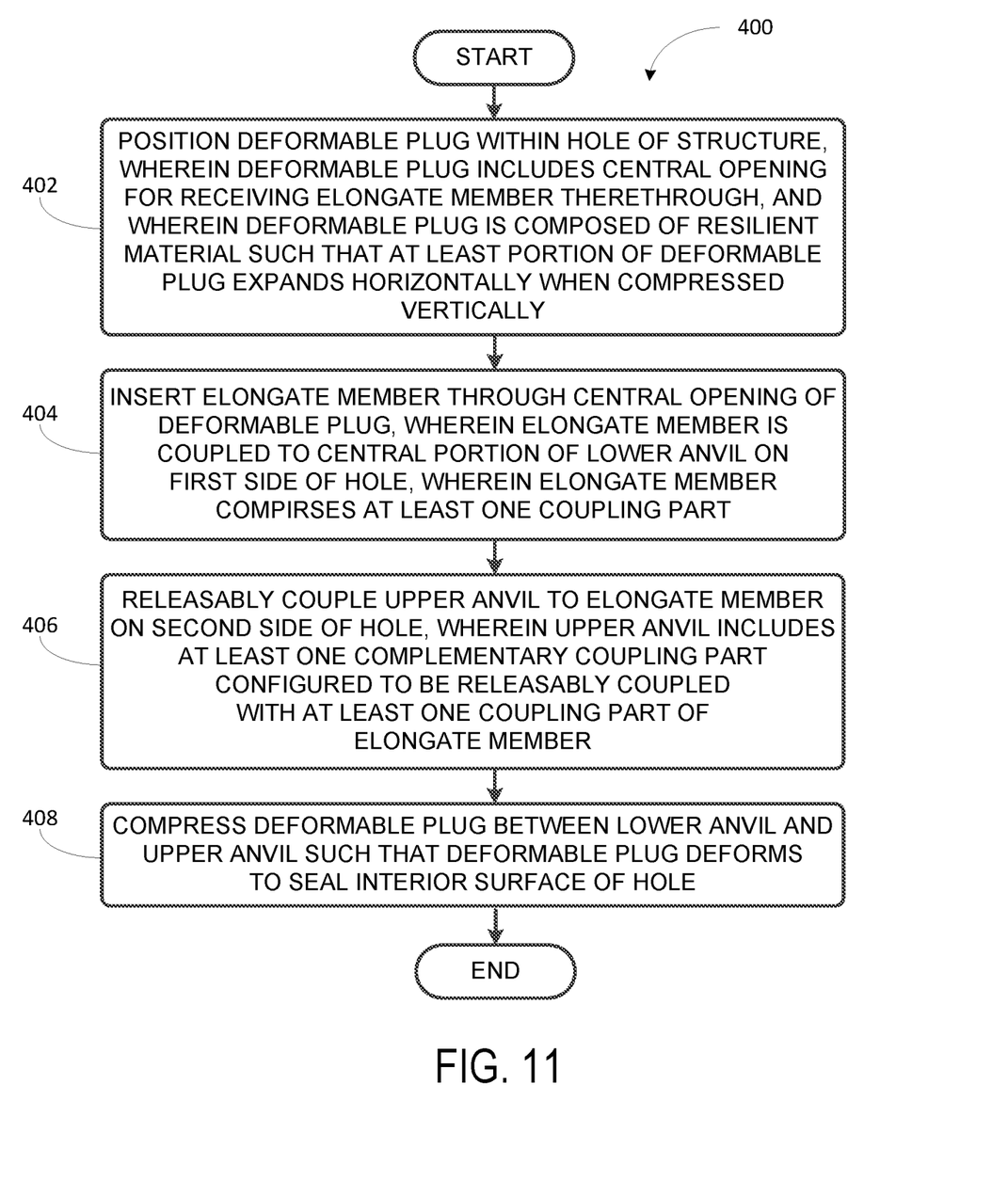
FIG. 11 shows a flowchart of an example method for installing a masking plug assembly to protect a hole in a structure.

FIG. 11 shows a flowchart of a method 400 for installing a masking plug assembly in a hole of a structure, according to an example implementation. Method 400 shown in FIG. 11 presents an embodiment of a method that, for example, could be used with the masking plug assembly 100 and the hole 201 in the structure 200, as shown in FIGS. 1-10 and discussed above. It should be understood that for this and other processes and methods disclosed herein, flowcharts show functionality and operation of one possible implementation of present embodiments. In this regard, each block in the flowchart may represent a module, a segment, or a portion of program code, which includes one or more instructions executable by a processor for implementing or causing specific logical functions or steps in the process. For example, the method 400 may be implemented by one or more computing devices of a robotic assembly system. Alternative implementations are included within the scope of the example embodiments of the present disclosure, in which functions may be executed out of order from that shown or discussed, including substantially concurrently, depending on the functionality involved, as would be understood by those reasonably skilled in the art.

At block 402, the method 400 includes positioning the deformable plug 108 within the hole 201 of the structure 200. The deformable plug 108 includes a central opening 109 for receiving the elongate member 102 therethrough. Further, the deformable plug 108 is composed of a resilient material such that at least the end portions 110 of the deformable plug 108 expands horizontally when compressed vertically, as discussed above.

As discussed above the interior surface 202 of the hole may include a countersunk surface 203. The deformable plug 108 may include a frusto-conical portion 111 having an upper diameter 112 and a smaller, lower diameter 113 connected by an angled portion 114, and a cylindrical portion 115 extending from the lower diameter 113 of the frusto-conical portion 111, as shown in FIG. 3. Accordingly, positioning the deformable plug 108 within the hole 201 may include positioning the deformable plug 108 such that the angled portion 114 of the deformable plug 108 contacts the countersunk surface 203 of the hole 201.

At block 404, the method 400 includes inserting the elongate member 102 through the central opening 109 of the deformable plug 108. As noted above, the elongate member 102 comprises at least one coupling part 104. In some implementations, the elongate member 102 may be inserted through the central opening 109 before the deformable plug 108 is positioned within the hole 201 of the structure 200. For example, in the example discussed above and shown in FIG. 7, the lower anvil 101 and elongate member 102 may be molded integrally with the deformable plug 108.

At block 406, the method 400 includes releasably coupling the upper anvil 105 to the elongate member 102 on a first side 206 of the hole 201, as can be seen in FIGS. 1 and 2. Further, the elongate member 102 is coupled to the central portion 103 of the lower anvil 101 on a second side 207 of the hole 201. The upper anvil 105 includes at least one complementary coupling part 107 configured to be releasably coupled with the at least one coupling part 104 of the elongate member 102.

As discussed in some of the examples above, coupling the upper anvil 105 to the elongate member 102 may include progressively coupling the at least one coupling part 104 of the elongate member 102 with the at least one complementary coupling part 107 of the upper anvil 105 so as to progressively decrease the distance 122 between the lower anvil 101 and the upper anvil 105. For instance, the series of ribs 124 on the elongate member 102 may be progressively coupled with the plurality of ratchet protrusions 127 on the upper anvil 105 that are sized to engage the series of ribs 124, as shown in FIGS. 1 and 2. Alternatively, threads 134 disposed around a circumference of the elongate member 102 may be progressively engaged with complementary threads 137 disposed around the central opening 106 of the upper anvil 105, as shown in FIGS. 9 and 10.

At block 408, the method 400 includes compressing the deformable plug 108 between the lower anvil 101 and the upper anvil 105 such that the deformable plug 108 deforms to seal the interior surface 202 of the hole 201. For instance, the hole 201 may include an upper edge 204 and a lower edge 205, as shown in FIGS. 1 and 2. Compressing the deformable plug 108 may include compressing the deformable plug 108 between the lower anvil 101 and the upper anvil 105 such that the deformable plug 108 deforms to seal the upper edge 204 and the lower edge 205 of the hole 201. The deformation may be, as discussed above, a horizontal expansion of the end portions 110 of the deformable plug 108 in response to the vertical compression between the lower anvil 101 and the upper anvil 105.

As discussed above, a chemical treatment or other manufacturing process may be applied to the structure 200 while the masking plug assembly 100 is installed in the hole 201, protecting its interior surface 202. After the manufacturing processes are complete, the upper anvil 105 may be decoupled from the elongate member 102, and the deformable plug 108 may be removed from the hole 201. For example, the plurality of ratchet protrusions 127 may be separated and disengaging from the series of ribs 124, allowing the elongate member 102 to be withdrawn from the central opening 106 of the upper anvil 105. Similarly, the upper anvil 105 shown in FIGS. 9 and 10 may be unthreaded from the elongate member 102.

Other arrangements of the masking plug assembly 100 are also possible, and some components of the assembly may be interchanged. For instance, based on the orientation of the structure 200 or the hole 201, the lower anvil 101 and the upper anvil 105 might be reversed in some applications. In some cases, these components may instead be referred to as a first anvil and a second anvil, to reflect that their use may not be limited to a particular orientation.

Figure 12:
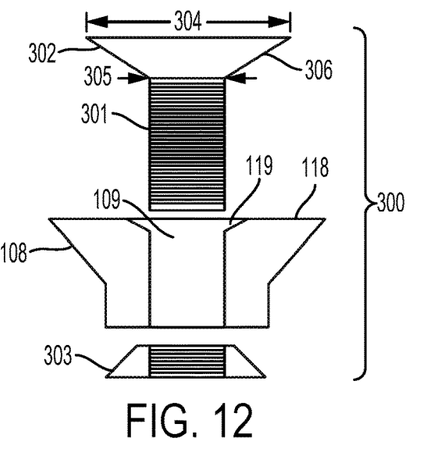
FIG. 12 illustrates a cross-sectional view of a masking plug assembly, according to an example implementation.
Figure 13:
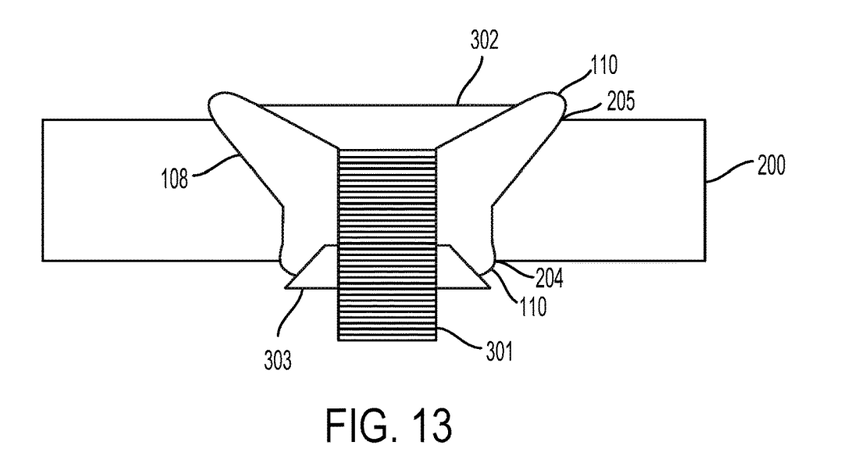
FIG. 13 illustrates a cross-sectional view of an assembled masking plug assembly in a hole in a structure, according to an example implementation.

The lower anvil 101 and the upper anvil 105 discussed in the examples above may take other forms as well. For example, FIGS. 12 and 13 illustrate a masking plug assembly 300, which includes a threaded screw 301 including a head 302. The masking plug assembly 300 also includes a threaded washer 303 that is sized to engage the threaded screw 301.

The masking plug assembly 300 also includes a deformable plug 108, which may be substantially similar or the same as the deformable plug 108 discussed in the examples above. Accordingly, the deformable plug 108 includes a central opening 109 for receiving the threaded screw 301 therethrough. Further, the deformable plug 108 is configured to be positioned within the hole 201 of the structure 200 between the head 302 and the threaded washer 303. As above, the deformable plug 108 is composed of a resilient material such that at least the end portions 110 of the deformable plug 108 expands horizontally when compressed vertically between the 302 and the threaded washer 303.

Similar to some of the components of the masking plug assembly 100 discussed above, the head 302 of the threaded screw 301 may include an upper diameter 304 and a smaller, lower diameter 305 connected by an angled portion 306. Further, the top side 118 of the deformable plug 108 may include a chamfer 119 surrounding the central opening 109 of the deformable plug 108, and an outer diameter 120 of the chamfer 119 may be larger than the lower diameter 305 of the head 302. As mentioned above, this arrangement may facilitate the horizontal expansion of the end portions 110 of the deformable plug 108 when it is vertically compressed between the head 302 and the threaded washer 303.

Figure 14:
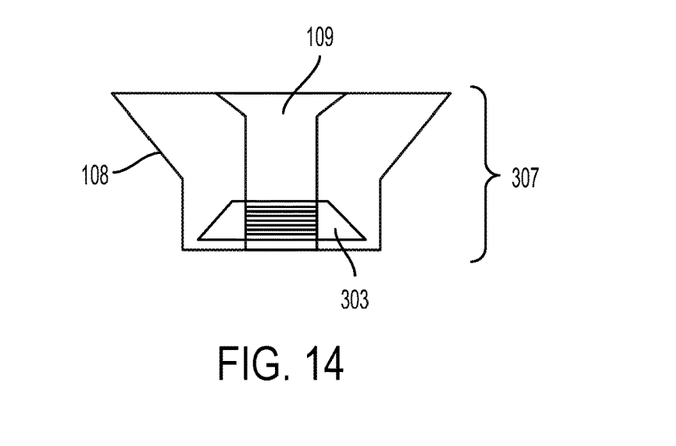
FIG. 14 illustrates a cross-sectional view of a deformable plug of a masking plug assembly, according to an example implementation.

FIG. 14 illustrates a cross-sectional view of the deformable plug 108 where the threaded washer 303 and the deformable plug 108 are one integral component 307. Similar to the example shown in FIG. 7 where the deformable plug 108 was formed integrally with the lower anvil 101, the threaded washer 303 may be insert molded into the deformable plug 108. As above, this may allow the masking plug assembly 300 to be installed from a single side of the hole 201, and also reduces the number of separate components in the masking plug assembly 300.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A masking plug assembly for protecting a hole in a structure, comprising:
    a lower anvil;
    an elongate member coupled to a central portion of the lower anvil, wherein the elongate member comprises at least one coupling part;
    an upper anvil having a central opening for receiving the elongate member therethrough, wherein the upper anvil comprises at least one complementary coupling part configured to be releasably coupled with the at least one coupling part of the elongate member; and
    a deformable plug comprising a central opening for receiving the elongate member therethrough, wherein the deformable plug is configured to be positioned within the hole of the structure between the lower anvil and the upper anvil, and wherein the deformable plug is composed of a resilient material such that at least a portion of the deformable plug expands horizontally when compressed vertically between the lower anvil and the upper anvil, wherein the portion of the deformable plug is an end portion contacting the lower anvil,
    wherein the at least one coupling part of the elongate member and the at least one complementary coupling part of the upper anvil are configured such that a distance between the lower anvil and the upper anvil progressively decreases as the at least one coupling part of the elongate member and the at least one complementary coupling part of the upper anvil are progressively coupled together.

2. The masking plug assembly of claim 1, wherein the deformable plug comprises a frusto-conical portion having an upper diameter and a smaller, lower diameter connected by an angled portion, and a cylindrical portion extending from the lower diameter of the frusto-conical portion.

3. The masking plug assembly of claim 1, wherein the upper anvil comprises an upper diameter and a smaller, lower diameter, wherein a top side of the deformable plug comprises a chamfer surrounding the central opening of the deformable plug, and wherein an outer diameter of the chamfer is larger than the lower diameter of the upper anvil.

4. The masking plug assembly of claim 1, wherein the lower anvil and the deformable plug comprise one integral component.

5. The masking plug assembly of claim 1, wherein the at least one coupling part of the elongate member comprises a series of ribs disposed along the elongate member, and wherein the at least one complementary coupling part of the upper anvil comprises a plurality of ratchet protrusions sized to engage the series of ribs.

6. The masking plug assembly of claim 1, wherein the at least one coupling part of the elongate member comprises threads disposed around a circumference of the elongate member, and wherein the at least one complementary coupling part of the upper anvil comprises complementary threads disposed around the central opening of the upper anvil and sized to engage the threads of the elongate member via rotation of the upper anvil.

7. The masking plug assembly of claim 1, wherein the end portion of the deformable plug which expands horizontally extends out of the hole of the structure along an interior surface of the hole.

8. A method for installing a masking plug assembly to protect a hole in a structure, comprising:
    positioning a deformable plug within the hole of the structure, wherein the deformable plug comprises a central opening for receiving an elongate member therethrough, and wherein the deformable plug is composed of a resilient material such that at least a portion of the deformable plug expands horizontally when compressed vertically;
    inserting the elongate member through the central opening of the deformable plug, wherein the elongate member comprises at least one coupling part;
    releasably coupling an upper anvil to the elongate member on a first side of the hole wherein the elongate member is coupled to a central portion of a lower anvil on a second side of the hole, and wherein the upper anvil comprises at least one complementary coupling part configured to be releasably coupled with the at least one coupling part of the elongate member, wherein releasably coupling the upper anvil to the elongate member comprises progressively coupling the at least one coupling part of the elongate member with the at least one complementary coupling part of the upper anvil so as to progressively decrease a distance between the lower anvil and the upper anvil; and
    compressing the deformable plug between the lower anvil and the upper anvil such that the deformable plug deforms to seal an interior surface of the hole,
    wherein the portion of the deformable plug is an end portion contacting the lower anvil, and wherein compressing the deformable plug between the lower anvil and the upper anvil comprises compressing the deformable plug such that the end portion of the deformable plug expands horizontally and extends out of the hole of the structure along an interior surface of the hole.

9. The method of claim 8, wherein the lower anvil and deformable plug comprise one integral component.

10. The method of claim 8, wherein the interior surface of the hole comprises a countersunk surface, wherein the deformable plug comprises a frusto-conical portion having an upper diameter and a smaller, lower diameter connected by an angled portion, and a cylindrical portion extending from the lower diameter of the frusto-conical portion, and wherein positioning the deformable plug within the hole comprises positioning the deformable plug such that the angled portion of the deformable plug contacts the countersunk surface of the hole.

11. The method of claim 8, wherein the hole comprises an upper edge and a lower edge, and wherein compressing the deformable plug comprises compressing the deformable plug between the lower anvil and the upper anvil such that the deformable plug deforms to seal the upper edge and the lower edge of the hole.

12. The method of claim 8, further comprising:
    before the deformable plug is positioned within the hole of the structure, inserting the elongate member through the central opening of the deformable plug.

13. The method of claim 8, wherein progressively coupling the at least one coupling part of the elongate member with the at least one complementary coupling part of the upper anvil comprises progressively coupling a series of ribs disposed along the elongate member with a plurality of ratchet protrusions disposed on the upper anvil, wherein the plurality of ratchet protrusions are sized to engage the series of ribs.

14. The method of claim 8, wherein progressively coupling the at least one coupling part of the elongate member with the at least one complementary coupling part of the upper anvil comprises rotating the upper anvil such that threads disposed around a circumference of the elongate member are progressively engaged with complementary threads disposed around the central opening of the upper anvil.

15. A masking plug assembly for protecting a hole in a structure, comprising:
    a threaded screw comprising a head;
    a threaded washer, wherein the threaded washer is sized to engage the threaded screw; and
    a deformable plug comprising a central opening for receiving the threaded screw therethrough, wherein the deformable plug is configured to be positioned within the hole of the structure between the head and the threaded washer such that the head and the threaded washer directly contact the deformable plug, and wherein the deformable plug is composed of a resilient material such that at least a portion of the deformable plug expands horizontally when compressed vertically between the head and the threaded washer,
    wherein the head of the threaded screw comprises an upper diameter and a smaller, lower diameter connected by an angled portion, wherein a top side of the deformable plug comprises a chamfer surrounding the central opening of the deformable plug, and wherein an outer diameter of the chamfer is larger than the lower diameter of the head.

16. The masking plug assembly of claim 15, wherein the deformable plug comprises a frusto-conical portion having the upper diameter and the smaller, lower diameter connected by the angled portion, and a cylindrical portion extending from the lower diameter of the frusto-conical portion.

17. The masking plug assembly of claim 15, wherein the threaded washer and the deformable plug comprise one integral component.

\* \* \* \* \*